United States Patent
Shin et al.

(10) Patent No.: US 6,306,361 B1
(45) Date of Patent: Oct. 23, 2001

(54) METHOD FOR MANUFACTURING PHOTOCATALYTIC ANATASE TITANIUM DIOXIDE POWDER

(75) Inventors: Dong-Woo Shin, Kyongnam; Bub-Jin Kim, Seoul, both of (KR)

(73) Assignee: Nano Co., Ltd. (KR)

( * ) Notice: Subject to any disclaimer, the term of this patent is extended or adjusted under 35 U.S.C. 154(b) by 0 days.

(21) Appl. No.: 09/520,680

(22) Filed: Mar. 7, 2000

(30) Foreign Application Priority Data

Apr. 23, 1999 (KR) .................................... 10-1999-14607

(51) Int. Cl.⁷ .................................................. C01G 23/047
(52) U.S. Cl. ............................. 423/610; 423/275; 423/69
(58) Field of Search ............................... 423/610, 69, 275

(56) References Cited

U.S. PATENT DOCUMENTS 5,447,708 * 9/1995 Helble et al. ........................ 423/610
5,833,892 * 11/1998 Gurav et al. ........................ 423/610

FOREIGN PATENT DOCUMENTS 61-168528 * 7/1986 (JP) ...................................... 423/610

* cited by examiner

Primary Examiner—Steven Bos

(57) ABSTRACT

A method for manufacturing an inexpensive and safe titanium dioxide powder having an excellent photocatalytic ability and a high purity of anatase phase crystalline structure by utilizing meta-titanic acid as a starting material is disclosed. Meta-titanic acid is first neutralized by a basic solution, followed by adding a metal oxide. Then, the meta-titanic acid is spray dried using hot air to obtain spherical shape granules. The granules are then sintered to obtain the resulting titanium dioxide powder having small sized porous second particles and a high specific surface area. As a result, an economical and highly effective photocatalytic titanium dioxide powder can be obtained.

14 Claims, 5 Drawing Sheets

METHOD FOR MANUFACTURING PHOTOCATALYTIC ANATASE TITANIUM DIOXIDE POWDER

BACKGROUND OF THE INVENTION

1. Field of the Invention

The present invention relates to a method for manufacturing a photocatalytic titanium dioxide powder, and more specifically to a method for manufacturing a photocatalytic titanium dioxide powder for use in wastewater treatment and air purification.

2. Description of the Prior Art

Generally, wastewater which is discharged by industries is comprised of organic substances commonly constituted with carbon, hydrogen, nitrogen, oxygen, and sulfur. To treat wastewater having such organic substances which are difficult to decompose, UV-ray and photocatalysts of titanium dioxide, zinc oxide, iron oxide, cadmium sulfate, or zinc sulfate are conventionally used to decompose organic substances which do not readily decompose. Amongst photocatalysts, titanium dioxide is most appropriate and widely used to treat wastewater.

Titanium dioxide also has a wide applications in pigments, inorganic membranes, and semiconductor industries. Titanium dioxide is commonly found in both anatase and rutile phase crystalline structures. In its rutile phase, it is used a white pigment and has an excellent dispersion effect of intercepting UV-rays. Further, because of its high dielectric constant in the rutile phase, titanium dioxide is used as a dielectric material in semiconductors, while it is used as a coating material for optical lenses due to its high refractive index. It also showed chemical stability in the presence of strong acids and bases.

In its anatase crystalline phase, titanium dioxide exhibits a high photo-activity and is commonly used in a system for optically decomposing trichloro-ethane and in a system for transferring solar energy as a photocatalyst.

Currently, titanium dioxide is commercially manufactured by utilizing a sulfate process or a chloride process. In sulfate process, ilmenite which is utilized as a starting raw mineral is pulverized and the resulting ground material is dissolved with sulfate to obtain anatase phase titanium dioxide. In chloride process, a natural or a synthesized raw material having 90% pure rutile phase is chlorinated to obtain titanium tetrachloride ($TiCl_4$), which is then reacted with oxygen to yield titanium dioxide having a rutile phase crystalline structure. Such chloride process for manufacturing titanium dioxide is disclosed by U.S. Pat. No. 5,698,177. Because the degree of the photocatalytic ability of the titanium dioxide power is mainly determined by its surface area, titanium dioxide powder particles having a smaller size and a greater specific surface area exhibit a higher photocatalytic ability.

In utilization of sulfate process to manufacture titanium dioxide, the impurities introduced during the manufacturing process tend to deteriorate the quality of the powder, while chlorine process which utilizes an erosive gas during the process necessitates having complex accompanying equipments, thus increasing the manufacturing cost for the titanium dioxide powder. Further, the powders obtained by the above processes have an average particle diameter of 200–400 nm and a specific surface area of 8–10 $m^2/g$, which are somewhat lacking and desire to be improved for optimizing the photocatalytic ability of titanium dioxide powder.

To be effectively used a photocatalyst, it is highly desired that the titanium dioxide powder has a specific surface area of greater than 50 $m^2/g$, an average diameter of the second particle of 100 nm, and a highly pure anatase crystalline phase. To manufacture such titanium dioxide power, a conventional method which utilizes $Ti(OC_3H7)_4$, $Ti(OC_2H_5)_4$ or titanium alkoxides as a starting material has been disclosed. In the method, the starting material is subjected to hydrolysis and condensation processes to obtain the resulting titanium dioxide. Such method has significant drawbacks in that the starting material is expensive and the process requires a strict manufacturing control to obtain the desired product.

Further, the chlorine process described earlier present a problem of having necessary equipments to deal with safety and toxicity of the starting materials, while its resulting product is significantly constituted with rutile phase titanium dioxide powder, making it unsuitable to be utilized as photocatalyst.

Recently, there has been proposed a method of utilizing titanium dioxide or meta-titanic acid with an additive to obtain titanium dioxide power for use in wastewater treatment. In this method, the above starting material mixed with the additive is subjected to a ball-mill process, then sintered to obtain the desired titanium dioxide powder. For example, Korea Patent Laid-Open Publication No. 98-684 discloses a method of utilizing the above titanium dioxide or meta-titanic acid with at least one additive from carbonates and hydroxides. In the method, the starting material having the additive is ball-milled and then sintered at 550–1100° C. to obtain the final titanium dioxide powder. Still, the titanium dioxide powder obtained the above process is inadequate to be used as a photocatalyst due to the small specific surface area and large average size of its particles.

SUMMARY OF THE INVENTION

In view of the foregoing, it is an object of the present invention to provide a method for manufacturing an inexpensive and safe titanium dioxide powder having an excellent photocatalytic ability and a high purity of anatase phase crystalline structure by utilizing meta-titanic acid.

In order to achieve the above object, the present invention provides a method for manufacturing a titanium dioxide powder. In the method, a metal oxide is added to meta-titanic acid $TiO(OH)_2$, followed by spray drying the meta-titanic acid having the metal oxide therein by utilizing a hot air to obtain a powder having granules with a spherical shape. The granular powder is then sintered to obtain a titanium dioxide having an anatase phase crystalline structure.

A titanium dioxide powder having an excellent photocatalytic ability and a high purity of anatase phase crystalline structure by utilizing inexpensive meta-titanic acid as a starting material is provided by the present invention.

BRIEF DESCRIPTION OF THE DRAWINGS

The above objects and other advantages of the present invention will become more apparent by describing in detail Experiments thereof with reference to the attached drawings in which.

DETAILED DESCRIPTION OF THE INVENTION

Figure 1:
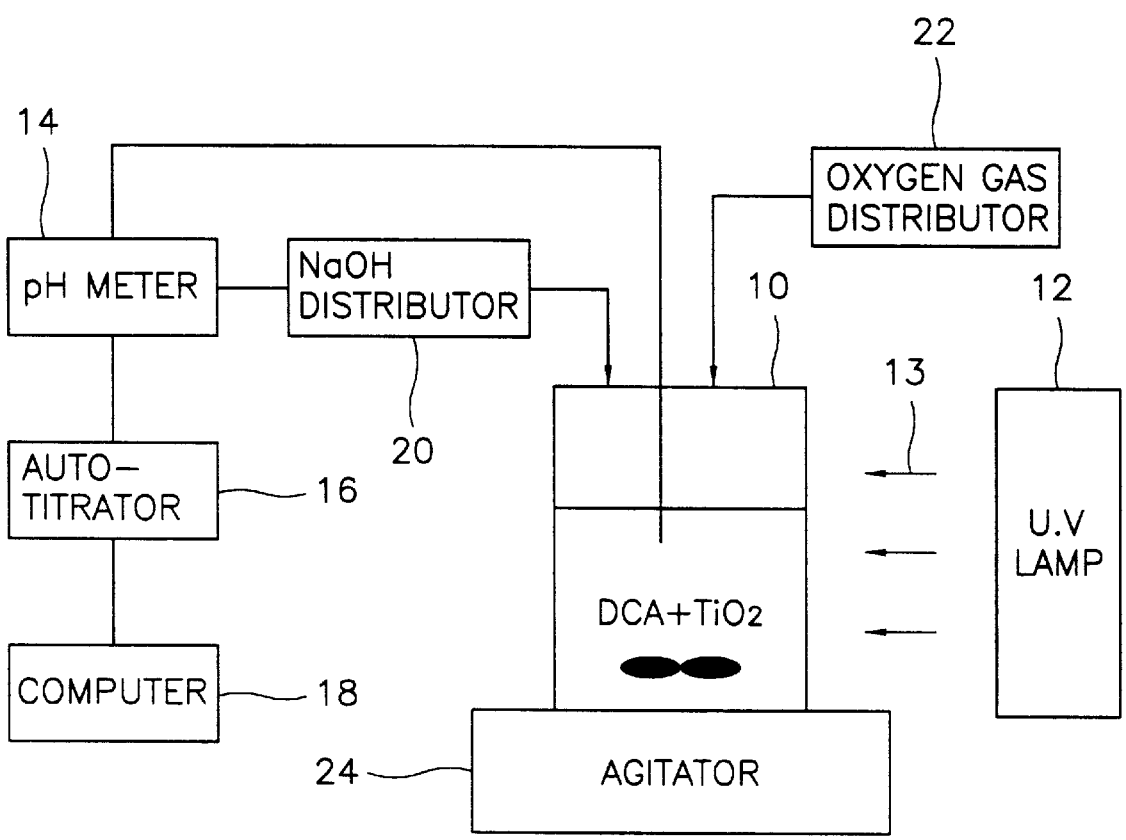
FIG. 1 is a schematic view illustrating an apparatus for measuring catalytic activity.

The present invention will now be described in detail below.

In the president invention, meta-titanic acid is utilized as a starting material for manufacturing titanium dioxide powder. To prepare meta-titanic acid, ilmenite $TiO_2 \cdot FeO$ which is the initial raw material of titanium dioxide is dissolved by sulfate, followed by removal of iron to obtain an intermediate compound $TiOSO_4$, which is then subjected to hydrolysis to obtain resulting meta-titanic acid. Meta-titanic acid prepared by the above outlined process is commercially available, such as KA-100 brand from Hankook Titanium Co (Republic of Korea).

In order to obtain a highly pure titanium dioxide powder, it is preferred to remove sulfates and impurities such as iron and magnesium contained in the meta-titanic acid. For removing the above undesirable sulfates and impurities a washing process using water is utilized. Since the process has no preference, any washing process utilizing water can be used. For example, the impurities can be separated according to solid/liquid phases by utilizing a filter press or a centrifuge apparatus.

Next, the meta-titanic acid is neutralized by using a basic solution. The meta-titanic acid prepared by sulfate process commonly contain significant amounts of sulfur trioxide $SO_3$ ion. Such ions remain as an impurity and deter the formation of fine powders during sintering process by coagulating.

For the neutralizing process, a large amount of water followed by a basic solution are added. Any basic solution which forms a salt when reacted with a strong acid can be used as a basic solution in the neutralizing process. Such basic solution can be aqueous $NH_4OH$ or aqueous $NaOH$ solution, and aqueous $NH_4OH$ solution is preferably used. The added amount of the basic solution is adjusted to obtain a pH of about 7–9.

The neutralization process is shown by the following chemical reaction.

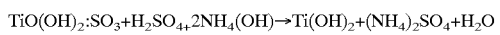

$$TiO(OH)_2:SO_3+H_2SO_4+2NH_4(OH) \rightarrow Ti(OH)_2+(NH_4)_2SO_4+H_2O$$

As shown by the above reaction, $TiO(OH)_2$ reacts with $NH_4(OH)$ to yield ammonium sulfate salt. The salt is removed by a wash utilizing distilled water.

After the wash, a metal oxide is added to the meta-titanic acid. The metal oxide is selected from the group consisting of iron oxide, tungsten oxide, zinc oxide, silver oxide, and chromium oxide. The metal oxides can be used alone or in mixtures thereof. If the metal oxides are added in amount less than 0.01 parts by weight per 100 part by weight of meta-titanic acid, it has a minimal effect of enhancing the photocatalytic activity, while in an amount greater than 1 parts by weight, it has a tendency to colorize other than white such as feint yellow or black. Accordingly, about 0.01–1 parts by weight the metal oxide is added to 100 parts by weight of the meta-titanic acid, preferably about 0.05–0.5 parts by weight.

Thereafter, the meta-titanic acid is uniformly mixed with the metal oxide. Then, by utilizing a spray dryer, the resulting compound is spray dried by hot air to form spherical shape granules. The spray drying method process yields spherical shape granules having a diameter less than 100 μm.

The granules are then sintered to obtain a titanium dioxide powder having anatase phase crystalline structure. During the sintering process, the titanium dioxide is separated from meta-titanic acid by vapor, as shown below.

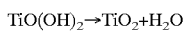

$$TiO(OH)_2 \rightarrow TiO_2+H_2O$$

At a sintering temperature below 300° C., amorphous phase is formed instead of desired anatase crystalline structure, while at a temperature above 650° C., the sizes of the granules becomes undesirably large to render a small specific surface area. Accordingly, the sintering process is carried out at a temperature of about 300–650° C., preferably about 400–600° C.

Further, if the sintering process is carried out for less than 1 hour, the sintering becomes inadequate to yield anatase phase crystalline structure and instead titanium dioxide remains in amorphous phase, and if the process is carried out for more than 4 hours, there is a risk of decreasing the photocatalytic activity of the titanium dioxide powder due to an excessive thermal exposure. If the sintering process proceed beyond 5 hours, the anatase phase may convert to rutile phase. Accordingly, the sintering process is carried out for about 1–4 hours, preferably about 1–3 hours.

The titanium dioxide powder obtained by the above described method has a specific surface area of about 90–110 $m^2/g$, a diameter of granules of less than 100 nm, and anatase phase purity of 97%, making it most appropriate to be used as a photocatalyst.

EXAMPLES

The following Examples are provided to further illustrate the invention and are not intended to limit the scope of the present invention.

Example 1

1000 g of meta-titanic acid manufactured by hydrolysis process (Hankook Titanium Co. of Republic of Korea, above 95% purity) was washed three times using 5 liters of water. Five liters of water was added to the washed meta-titanic acid. The meta-titanic acid was then neutralized by adding 50 ml of 25% aqueous $NH_4OH$ solution up to a pH of 7.2. After neutralization, the meta-titanic acid was washed with 5 liters of water to remove salts produced by the reaction in the neutralization process.

The neutralized meta-titanic acid was then uniformly dispersed by adding 3 g of iron oxide, followed by spray drying the resultant with a spray dryer utilizing hot air to obtain spherical granules having a particle size of 100 μm. The spray drying was carried out in standard conditions, where the internal temperature was 200° C. and the spray dryer was set at 10,000 RPM.

The granules was then subjected to a sintering process for 2 hours at 600° C. to obtain a titanium dioxide powder.

Properties of the powder was measured and shown in Table 1.

Example 2

A titanium dioxide powder was obtained by the same process described by Example 1, except 2 g of iron oxide was used.

Properties of the powder was measured and shown in Table 1.

Example 3

A titanium dioxide powder was obtained by the same process described by Example 1, except the sintering process was carried out at 550° C.

Properties of the powder was measured and shown in Table 1.

Comparative Example 1

A titanium dioxide powder was obtained by the same process described by Example 1, except the sintering process was carried out at 250° C.

Properties of the powder was measured and shown in Table 1.

Comparative Example 2

A titanium dioxide powder was obtained by the same process described by Example 1, except the sintering process was carried out at 700° C.

Properties of the powder was measured and shown in Table 1.

Comparative Example 3

A titanium dioxide powder was obtained by the same process described by Example 1, except the sintering process was carried out for 30 minutes.

Properties of the powder was measured and shown in Table 1.

Comparative Example 4

A titanium dioxide powder was obtained by the same process described by Example 1, except the sintering process was carried out for 4.5 hours.

Properties of the powder was measured and shown in Table 1.

Comparative Example 5

A titanium dioxide powder was obtained by the same process described by Example 1, except 10 g of iron oxide was used.

Properties of the powder was measured and shown in Table 1.

Comparative Example 6

A titanium dioxide powder was obtained by the same process described by Example 1, except 0.1 g of iron oxide was used.

Properties of the powder was measured and shown in Table 1.

(In Table 1: SS Area indicates specific surface area; ADSP indicates average diameter of second particles; chemical stability indicates stability in presence of acids and bases; and spheri. indicates spherical shape)

As shown by Table 1, the titanium dioxide powders obtained by Examples 1 through 3 exhibited excellent properties to be suitably applied as photocatalysts. The titanium dioxide powder obtained by Comparative Example 1 showed amorphous phase, while the titanium dioxide powders obtained by Comparative Examples 2, 4 and 5 have second particles showing a small specific surface area to render them unsuitable photocatalysts. Although, the titanium oxide powder obtained by Comparative Examples 3 and 6 exhibited satisfactory properties, it was later determined that they showed an inadequate photocatalytic activity. The titanium dioxide powder obtained by Comparative Example 5 was determined unsuitable for the photocatalytic application as it showed yellow coloration.

Measurement of Photocatalytic Activity

The photocatalytic activities of the titanium dioxide powders obtained by Examples 1 to 3 were measured against commercially available titanium dioxide powders conventionally used for the photocatalytic applications. UV-100 manufactured by Hombikat of Germany and ST-01 manufactured by Ishihara of Japan were respectively used as photocatalyst A and photocatalyst B.

FIG. 1 is a schematic view illustrating an apparatus for measuring catalytic activity. For optical decomposition reaction, a reactor 10 made from transparent quartz was utilized. The reactants were mixed by a agitator 24 which rotated a magnetic bar inserted in the reactor 10. An oxygen gas distributor 22 installed at an inner side of the reactor 10 supplied a continuous flow of oxygen gas. For the optical decomposition reaction to be carried out in the reactor 10, an UV-lamp 12 was utilized to irradiate the reactor 10 with a light 13.

For the test substance, DCA (dichloro acetic acid) having a concentration of 1 mM was used. A pH meter 14 was utilized to measure pH of the reactor 10 during optical decomposition of the test substance, while an auto-titrator 16 was used to introduce NaOH solution from a sodium hydroxide distributor 20 to maintain a constant pH. The amount of NaOH solution added to the reactor 10 was measured by a computer 18. The amount of hydrogen ion released by the optical decomposition reaction by the presence of NaOH solution added into the reactor 10, was measured.

TABLE 1

| | Ex. 1 | Ex. 2 | Ex. 3 | C. Ex. 1 | C. Ex. 2 | C. Ex. 3 | C. Ex. 4 | C. Ex. 5 | C. Ex. 6 |
|---|---|---|---|---|---|---|---|---|---|
| Color | white | white | white | white | white | white | white | yellow | white |
| Phase | anatase | anatase | anatase | amorph. | anatase | anatase | anatase | anatase | anatase |
| Shape | spheri. | spheri. | spheri. | spheri. | spheri. | spheri. | spheri. | spheri. | spheri. |
| $TiO_2$ Purity | 98.5% | 98.2% | 98.6% | 98.1% | 99.1% | 98.2% | 98.8% | 97.9% | 98.9% |
| SS Area $(m^2/g)$ | 97 | 101 | 109 | 240 | 35.s | 115 | 85 | 89 | 102 |
| ADSP | 80 nm | 80 nm | 75 nm | 70 nm | 90 nm | 80 nm | 80 nm | 80 nm | 80 nm |
| pH | 7.2 | 7.1 | 7.2 | 7.4 | 6.9 | 7.2 | 7.2 | 6.8 | 7.2 |
| Chem. Stability | stable | stable | stable | stable | stable | stable | stable | stable | stable |

To the reactor 10 having a volume of 50 ml, respective 0.1 g of the titanium oxide powders obtained by Examples 1 to 3 and the conventional photocatalysts A and B were added for their respective tests along with 30 ml of 1 mM DCA. By adding NaOH solution, the pH of reactor was maintained at 3. The reactants were irradiated with the ray 13 from the UV-lamp 12, while being mixed by the magnetic bar through the operation of the agitator 24.

During the respective tests, in response to the corresponding photocatalyst, DCA decomposed and released hydrogen ions which was measured by the pH meter 14, and NaOH solution was supplied to the reactor 10 to constantly maintain the pH of 3. The amount of NaOH solution added was measured after 10 seconds, 5 minutes and 10 minutes. After 10 minutes, the amount was measured at 10 min. intervals. The measured values are shown by a graph represented in FIG. 2.

Figure 2:
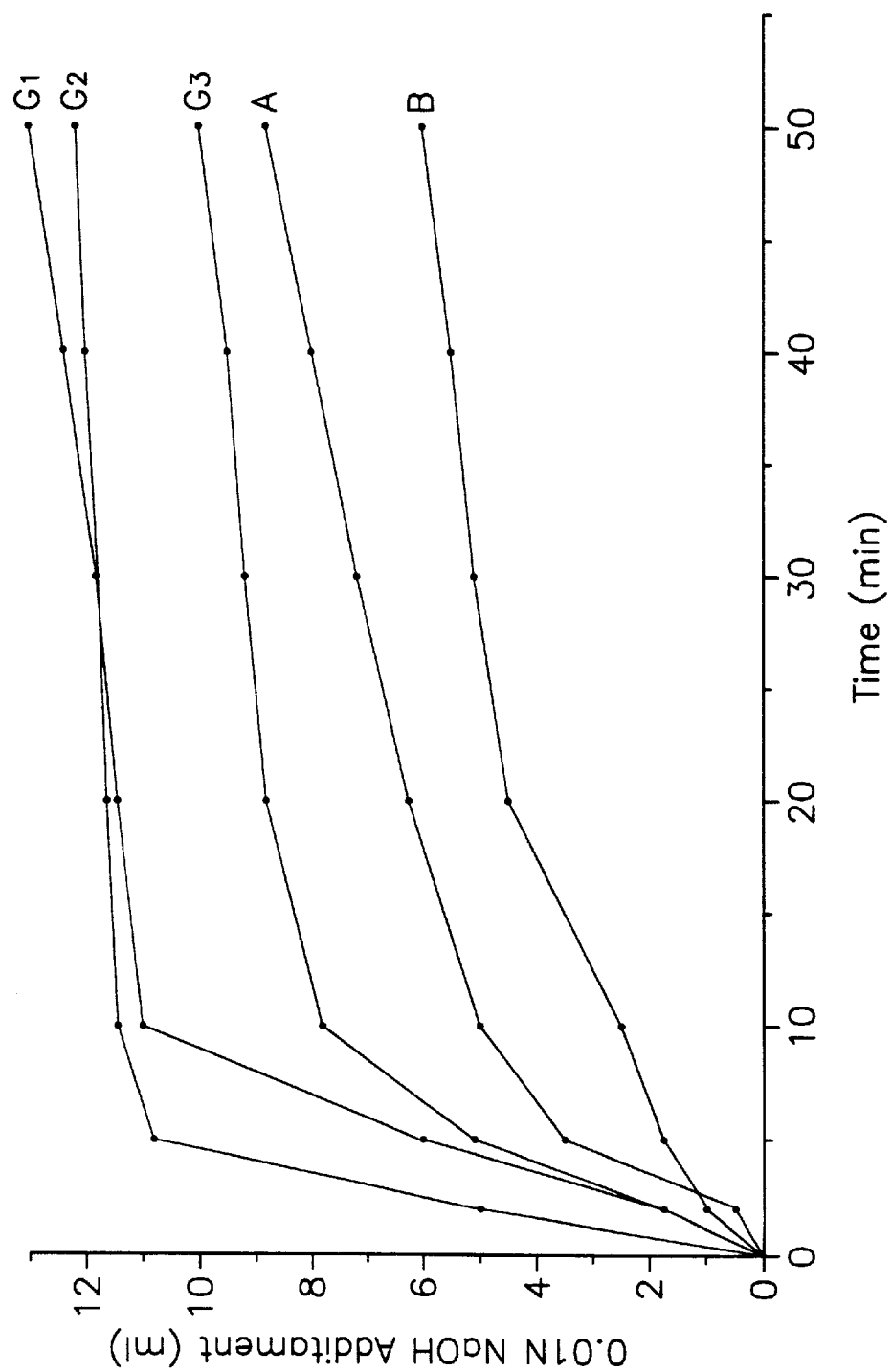
FIG. 2 is graphs showing the measured catalatic activity of the photocatalysts obtained by Examples 1 to 3 and the conventional photocatalysts.

In FIG. 2, lines G1, G2, G3, A, and B respectively represent the titanium dioxide powders obtain by Examples 1 to 3 and photocatalysts A and B. Vertical-axis represents the amount of NaOH solution added and longitudinal-axis represents time.

As it can be determined from the graph in FIG. 2, the titanium dioxide powders obtained from Examples 1 to 3 are drastically more effective in decomposing DCA, as they exhibited far more superior photocatalytic activities (almost twice as much) over the conventional photocatalysts.

Figure 3:
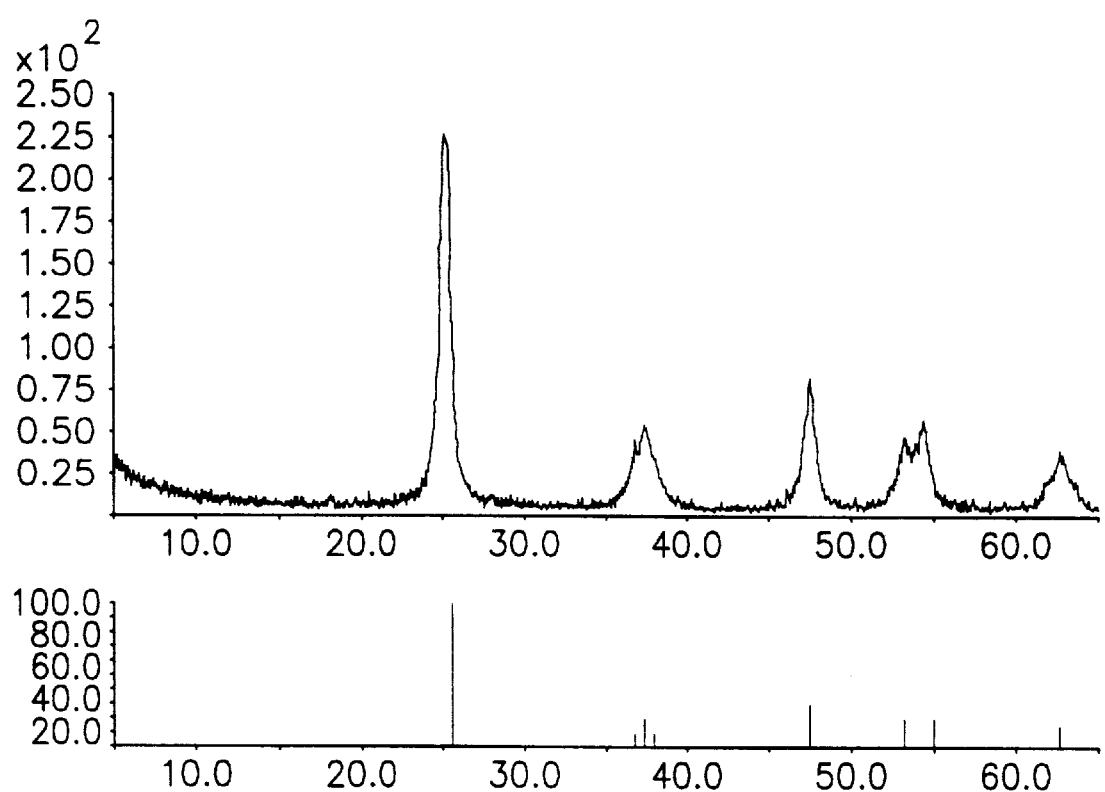
FIG. 3 is an X-ray diffraction graph of a titanium dioxide powder of the present invention.

FIG. 3 is an X-ray diffraction graph of the titanium dioxide powder obtain by Example 3. In FIG. 3, vertical-axis represents relative intensity and longitudinal-axis represents X-ray diffraction angle θ. From the X-ray diffraction graph, it can be determined that the titanium dioxide powder obtained by Example 3 is comprised of highly pure anatase phase crystalline.

Figure 4A:
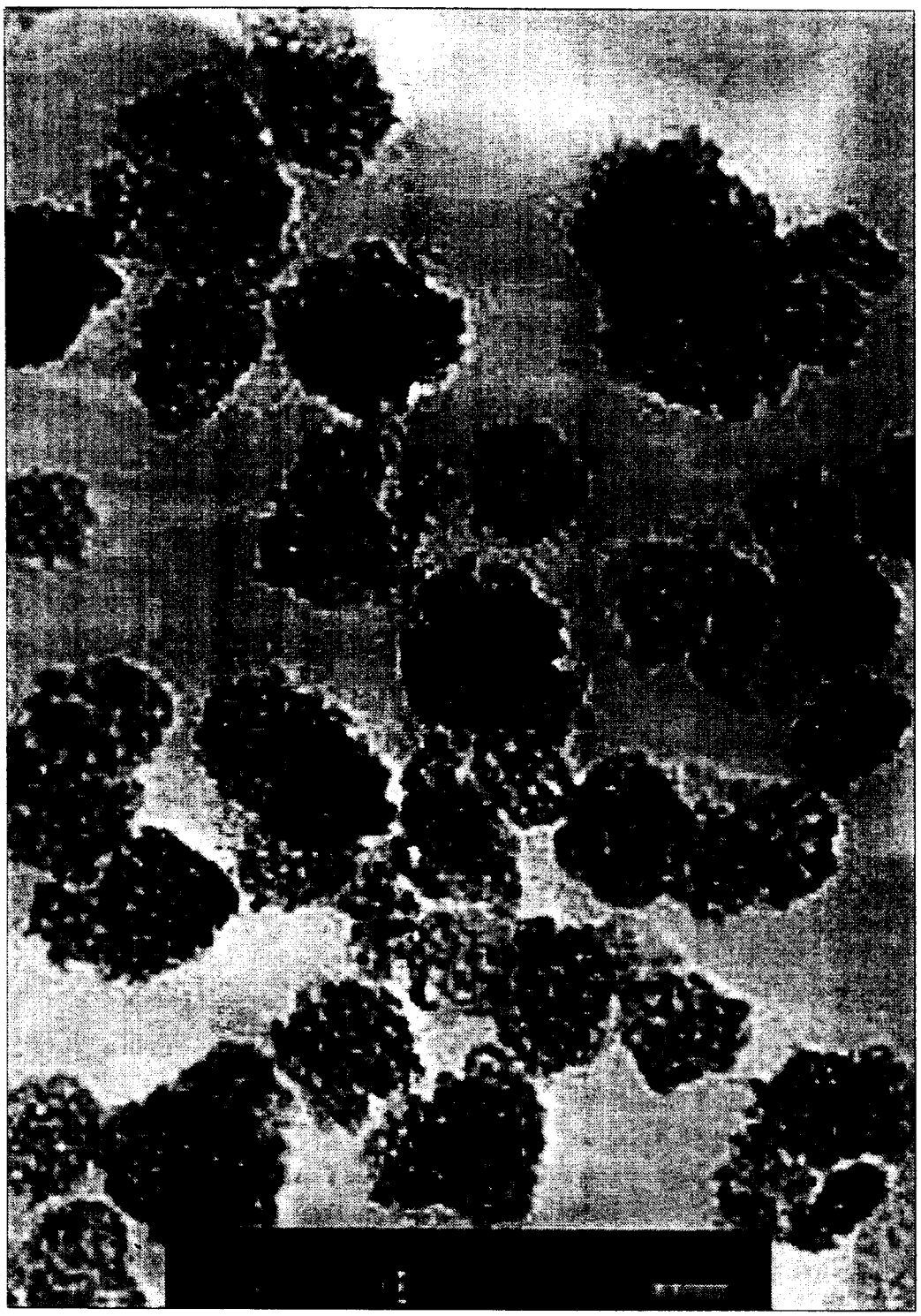
FIGS. 4A and 4B are TEM photographs of a titanium dioxide powder obtained by Experiment 3 of the present invention and a conventional titanium dioxide used in pigments, respectively.
Figure 4B:
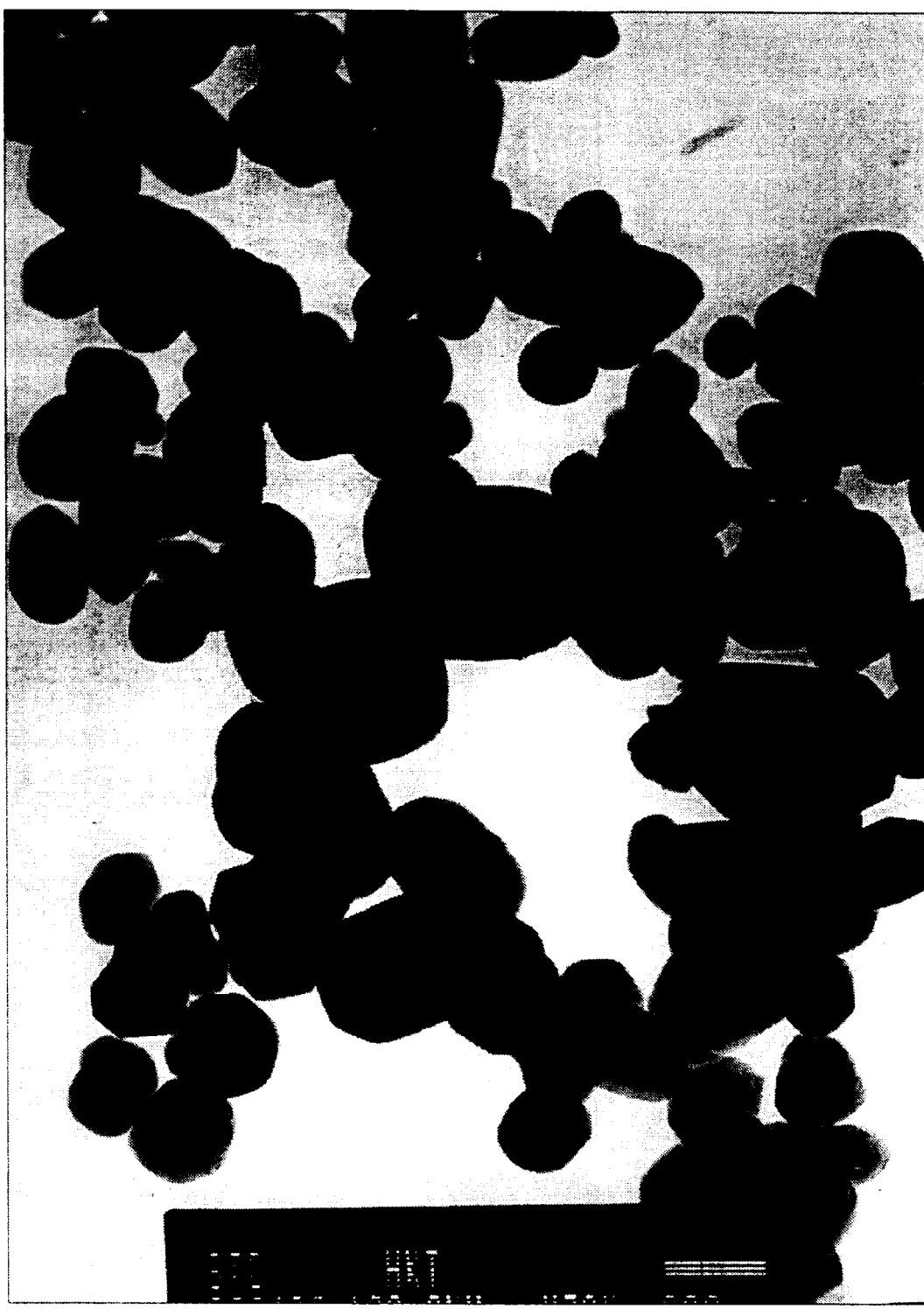

FIGS. 4A and 4B are respective TEM photographs of the titanium powder obtained by Example 3 and a conventional titanium dioxide powder used in pigments. As shown by the photographs, the titanium oxide of Example 3 exhibits the second particles of about 70 nm on average and the second particle is comprised of a number of finer first particles in the range of 1–2 nm which are coarsely agglomerated to form the second particles. In contrast, as shown by the photograph, the conventional titanium dioxide power is comprised of large granules having a size of 200 nm.

According to the present invention, meta-titanic acid is used as a starting material. Meta-titanic acid is first neutralized by a basic solution, then impurities such as sulfur trioxide are removed, followed by adding a metal oxide. Thereafter, the meta-titanic acid is spray dried using hot air to obtain spherical shape granules. The granules are then sintered to obtain the resulting titanium dioxide powder having small sized granules and a high specific surface area. As a result, the present invention provides an inexpensive titanium dioxide powder exhibiting an exceptionally high photocatalytic activity.

While the present invention has been particularly shown and described with reference to particular Examples thereof, it will be understood by those skilled in the art that various changes in from and details may be effected therein without departing from the spirit and scope of the invention as defined by the appended claims.

What is claimed is:

1. A method for manufacturing a titanium dioxide powder comprising the steps of:
   adding a metal oxide to meta-titanic acid;
   spray drying the meta-titanic acid having the metal oxide therein with hot air to obtain a powder of granules having a spherical shape; and
   sintering the powder to obtain titanium dioxide having an anatase phase crystalline structure.

2. A method for manufacturing a titanium dioxide powder as claimed in claim 1, wherein the meta-titanic acid is a product obtained by hydrolysis of $TiOSO_4$.

3. A method for manufacturing a titanium dioxide powder as claimed in claim 2, wherein impurities contained in the meta-titanic acid are removed by neutralizing the meta-titanic acid with a basic solution until a pH of about 7–9 has been reached, followed by a wash with distilled water.

4. A method for manufacturing a titanium dioxide powder as claimed in claim 3, wherein the neutralizing step is accomplished with at least one basic composition selected from the group consisting of aqueous $NH_4OH$ solution and aqueous NaOH solution.

5. A method for manufacturing a titanium dioxide powder as claimed in claim 1, wherein the metal oxide is at least one selected from the group consisting of iron oxide, tungsten oxide, zinc oxide, silver oxide, and chromium oxide, and is added into meta-titanic acid in an amount of about 0.01–1 parts by weight.

6. A method for manufacturing a titanium dioxide powder as claimed in claim 1, wherein the spherical granules have an average size of 100 μm.

7. A method for manufacturing a titanium dioxide powder as claimed in claim 1, wherein the sintering is carried out at about 400–600° C. for about 1–3 hours.

8. A method for manufacturing a titanium dioxide powder as claimed in claim 1, wherein the titanium dioxide powder has a specific surface area of about 90–110 $m^2/g$, an average diameter of crystals less than 100 nm, and an anatase crystalline purity of 98%.

9. A method for manufacturing a titanium dioxide powder comprising the steps of:
   removing impurities contained in meta-titanic acid obtained by hydrolysis of $TiOSO_4$ by neutralizing the meta-titanic acid with a basic solution to a pH of about 7–9;
   washing the neutralized meta-titanic acid with distilled water
   adding a metal oxide to the washed meta-titanic acid;
   spray drying the meta-titanic acid having the metal oxide therein with hot air to obtain a powder of granules having a spherical shape; and
   sintering the powder to obtain a titanium dioxide having an anatase phase crystalline structure.

10. A method for manufacturing a titanium dioxide powder as claimed in claim 9, wherein the neutralizing step is accomplished with at least one basic composition selected from the group consisting of aqueous $NH_4OH$ solution and aqueous NaOH solution.

11. A method for manufacturing a titanium dioxide powder as claimed in claim 9, wherein the metal oxide is at least one selected from the group consisting of iron oxide, tungsten oxide, zinc oxide, silver oxide, and chromium oxide, and is added into meta-titanic acid in an amount of about 0.01–1 parts by weight.

12. A method for manufacturing a titanium dioxide powder as claimed in claim 9, wherein the spherical granules have an average size of 100 μm.

13. A method for manufacturing a titanium dioxide powder as claimed in claim 9, wherein the sintering is carried out at about 400–600° C. for about 1–3 hours.

14. A method for manufacturing a titanium dioxide powder as claimed in claim 9, wherein the titanium dioxide powder has a specific surface area of about 90–110 $m^2/g$, an average diameter of crystals less than 100 nm, and an anatase crystalline purity of 98%.

\* \* \* \* \*